(12) United States Patent  (10) Patent No.: US 7,567,445 B2
Coulson et al.  (45) Date of Patent: Jul. 28, 2009

(54) SWITCH MODE POWER SUPPLY CONTROLLERS

(75) Inventors: David Robert Coulson, Comberton (GB); Johan Piper, Cambridgeshire (GB); David M. Garner, London (GB)

(73) Assignee: Cambridge Semiconductor Limited (GB)

( * ) Notice: Subject to any disclaimer, the term of this patent is extended or adjusted under 35 U.S.C. 154(b) by 227 days.

(21) Appl. No.: 11/445,473

(22) Filed: Jun. 1, 2006

(65) Prior Publication Data

US 2007/0274106 A1 Nov. 29, 2007

(51) Int. Cl.
*H02M 3/335* (2006.01)
*H02M 1/12* (2006.01)

(52) U.S. Cl. ..................... 363/21.12; 363/41
(58) Field of Classification Search ................. 363/18, 363/19, 20, 21.01, 21.04, 21.08, 21.1, 21.12, 363/21.16, 21.18, 74, 97, 95, 131, 41
See application file for complete search history.

(56) References Cited

U.S. PATENT DOCUMENTS

| 4,672,516 | A | | 6/1987 | Ney et al. |
|---|---|---|---|---|
| 5,452,195 | A | * | 9/1995 | Lehr et al. ............ 363/20 |
| 5,748,461 | A | * | 5/1998 | Preller ............... 363/97 |
| 5,831,839 | A | * | 11/1998 | Pansier ............ 363/21.16 |
| 5,901,052 | A | | 5/1999 | Strijker |
| 5,910,887 | A | * | 6/1999 | Kim ............... 363/21.13 |
| 5,940,281 | A | | 8/1999 | Wolf |
| 6,301,135 | B1 | | 10/2001 | Mammano et al. |
| 6,333,624 | B1 | | 12/2001 | Ball et al. |
| 6,373,726 | B1 | | 4/2002 | Russell |
| 6,385,059 | B1 | | 5/2002 | Telefus et al. |
| 6,396,718 | B1 | * | 5/2002 | Ng et al. ............ 363/21.07 |
| 6,590,789 | B2 | | 7/2003 | Bailly |
| 6,707,283 | B1 | | 3/2004 | Ball |
| 6,721,192 | B1 | | 4/2004 | Yang et al. |
| 6,836,415 | B1 | | 12/2004 | Yang et al. |
| 6,862,198 | B2 | | 3/2005 | Muegge et al. |
| 6,882,552 | B2 | | 4/2005 | Telefus et al. |

(Continued)

FOREIGN PATENT DOCUMENTS

WO WO-97/13314 A1 4/1997

(Continued)

OTHER PUBLICATIONS

"UK Search Report for corresponding GB 0610211.5", (Jul. 12, 2007), 1 pg.

(Continued)

*Primary Examiner*—Akm E Ullah
*Assistant Examiner*—M'Baye Diao
(74) *Attorney, Agent, or Firm*—Schwegman, Lundberg & Woessner, P.A.

(57) ABSTRACT

This invention relates to SMPS controllers employing primary side sensing. We describe a system for identifying a knee point in a sensing waveform, at which the output voltage of the SMPS may be sampled accurately on the primary side. The system identifies the knee point by fitting a tangent to a portion of a power transformer voltage waveform, and samples the voltage waveform at the knee point to determine the SMPS output voltage. In preferred embodiments this technique is implemented using a decaying peak detector, providing a timing signal indicating detection of the knee point. Sample/hold and error amplifier circuits may be employed to achieve output voltage regulation.

17 Claims, 5 Drawing Sheets

U.S. PATENT DOCUMENTS

| | | |
|---|---|---|
| 6,885,568 B2 * | 4/2005 | Kernahan et al. ............ 363/97 |
| 6,900,995 B2 | 5/2005 | Muegge et al. |
| 6,956,750 B1 | 10/2005 | Eason et al. |
| 6,958,920 B2 | 10/2005 | Mednik et al. |
| 6,972,969 B1 | 12/2005 | Shteynberg et al. |
| 6,977,824 B1 | 12/2005 | Yang et al. |
| 6,985,368 B2 | 1/2006 | Park |
| 7,016,204 B2 | 3/2006 | Yang et al. |
| 7,027,312 B2 | 4/2006 | Park |
| 2002/0015315 A1 | 2/2002 | Telefus |
| 2005/0024898 A1 | 2/2005 | Yang et al. |
| 2005/0073862 A1 | 4/2005 | Mednik et al. |
| 2005/0169017 A1 | 8/2005 | Muegge et al. |
| 2005/0276083 A1 | 12/2005 | Berghegger |
| 2005/0285587 A1 | 12/2005 | Yang et al. |
| 2006/0034102 A1 | 2/2006 | Yang et al. |
| 2006/0050539 A1 | 3/2006 | Yang et al. |
| 2006/0055433 A1 | 3/2006 | Yang et al. |
| 2006/0056204 A1 | 3/2006 | Yang et al. |
| 2007/0121349 A1 | 5/2007 | Mednik et al. |
| 2007/0133234 A1 | 6/2007 | Huynh et al. |
| 2007/0274107 A1 | 11/2007 | Garner et al. |
| 2007/0274112 A1 | 11/2007 | Lalithambika et al. |
| 2008/0037294 A1 | 2/2008 | de Silva et al. |

FOREIGN PATENT DOCUMENTS

| | | |
|---|---|---|
| WO | WO-03047079 A2 | 6/2003 |
| WO | WO-2004/051834 A1 | 6/2004 |
| WO | WO-2004051834 A1 | 6/2004 |
| WO | WO-2004082119 A2 | 9/2004 |
| WO | WO-2004/112229 A1 | 12/2004 |
| WO | WO-2004112226 A1 | 12/2004 |
| WO | WO-2004112227 A1 | 12/2004 |
| WO | WO-2005011095 A1 | 2/2005 |
| WO | WO-2005048442 A1 | 5/2005 |

OTHER PUBLICATIONS

"U.S. Appl. No. 11/445,476, Notice of Allowance mailed Feb. 17, 2009".

"U.S. Appl. No. 11/445,476, Response filed Dec. 1, 2008 to Non-Final Office Action mailed Jul. 1, 2008", 14.

"PCT Application No. PCT/GB2007/050233, International Search Report mailed Sep. 27, 2007", 2 pgs.

"UK Search Report for corresponding GB 0610208.1", (Jul. 12, 2007),1 pg.

Schrüfer, E., *Elektrische Meßtechnik: Messung elektrischer und nichtelektrischer Größen*, Carl Hanser Verlag, Munchen,(1983), 299-200.

* cited by examiner

SWITCH MODE POWER SUPPLY CONTROLLERS

RELATED APPLICATION

This application claims priority under 35 U.S.C. 119 from United Kingdom Application No. 0610211.5 filed 23 May 2006, which application is incorporated herein by reference.

FIELD OF THE INVENTION

This invention generally relates to a switch mode power supply (SMPS) controllers and to related methods. More particularly it relates to SMPS controllers employing primary side sensing to detect in a sensing waveform, at which point the output voltage of the SMPS may be sampled on the primary side.

BACKGROUND TO THE INVENTION

Broadly speaking in a switch mode power supply a magnetic energy storage device such as a transformer or inductor is used to transfer power from an input side to an output side of the SMPS. A power switch switches power to the primary side of the energy storage device, during which period the current and magnetic field builds up linearly. When the switch is opened the magnetic field (and secondary side current) decreases substantially linearly (on average) as power is drawn by the load on the output side.

An SMPS may operate in either a discontinuous conduction mode (DCM) or in continuous conduction mode (CCM) or at the boundary of the two in a critical conduction mode. In DCM operating modes in which, when the switching device is turned off, the output voltage steadily, but gradually, declines until a point is reached on the knee of the output curve at which substantially zero output current flows and the inductor or transformer begins to ring, entering a so-called oscillatory phase. The period of the ringing is determined by the inductance and parasitic capacitance of the circuit. In this specification DCM includes so-called critical (discontinuous conduction) mode (CRM) operation in which the power switch is turned on again at the first trough of the oscillatory phase (sometimes referred to as the flyback oscillation). Operation in CRM can be particularly efficient by reducing losses associated with the power switch turn-off transition. In continuous conduction mode (CCM) the power switch is turned on to "recharge" the flux in the inductor or transformer for a subsequent cycle before the flux, and hence output current, has fallen to zero (so that the inductor or transformer is substantially always "on"). Embodiments of the techniques we describe are useful for all these three modes of operation.

Often the output voltage of an SMPS is regulated by sensing circuitry on the output side, coupled back to the input side of the SMPS by means of an opto-isolator. However some improved techniques employ primary side sensing or, more generally, sensing employing an auxiliary winding on the magnetic energy storage device, or in some related circuits an auxiliary winding of an output filter inductor.

Some background prior art relating to primary side sensing can be found in U.S. Pat. Nos. 6,958,920; 6,721,192; US2002/015315; WO2005/048442; WO2004/051834; US2005/0024898; US2005/0169017; U.S. Pat. Nos. 6,956,750; 6,862,198; US2006/0056204; U.S. Pat. No. 7,016,204; US2006/0050539; US2006/0055433; US2006/0034102; U.S. Pat. Nos. 6,900,995; 6,862,198; and 6,836,415. Still further background prior art can be found in U.S. Pat. No. 6,385,059, US20050276083, U.S. Pat. Nos. 6,977,824, 6,956,750, WO2004082119, U.S. Pat. No. 6,972,969, WO03047079, U.S. Pat. No. 6,882,552, WO2004112227, US2005285587, WO2004112226, WO2005011095, U.S. Pat. Nos. 6,985,368, 7,027,312, 6,373,726, 4,672,516, 6,301,135, 6,707,283, and 6,333,624.

Referring now to FIG. 1, this shows an example of a switch mode power supply circuit with primary side sensing. The power supply comprises an AC mains input coupled to a bridge rectifier 14 to provide a DC supply to the input side of the power supply. This DC supply is switched across a primary winding 16 of a transformer 18 by means of a power switch 20, in this example an insulated gate bipolar transistor (IGBT). A secondary winding 22 of transformer 18 provides an AC output voltage which is rectified to provide a DC output 24, and an auxiliary winding 26 provides a feedback signal voltage proportional to the voltage on secondary winding 22. This feedback signal provides an input to a control system 28, powered by the rectified mains. The secondary winding is usually physically isolated from the primary winding (and auxiliary winding, if present) and their associated components to meet legislative requirements. The control system provides a drive output 30 to the power switching device 20, modulating pulse width and/or pulse frequency to regulate the transfer of power through transformer 18, and hence the voltage of DC output 24. In embodiments the power switch 20 and controller 28 may be combined on a single power integrated circuit.

As can be seen, the primary side controlled SMPS of FIG. 1 derives feedback information from the primary side of the transformer, using an auxiliary winding to avoid high voltage signals, the voltage being stepped down by the turns ratio of the transformer. As the skilled person will appreciate, however, it is not necessary to employ a separate auxiliary winding although this may be convenient if such a winding is already contemplated to provide a low voltage supply to the controller. For example, a voltage of the primary winding may be sensed, preferably capacitor coupled so that it can be referenced to the ground of the controller, and stepped down using a potential divider. An example circuit for this is shown inset in FIG. 1, with a dashed connection to the primary winding 16. The skilled person will further appreciate that an auxiliary winding is not necessary to provide a dc supply for the controller as this may be derived from the high voltage dc supply on the primary side of the SMPS or in a number of other ways, for example using a capacitor charge pump driven via a diode from the switched voltage on the power switch. In some preferred implementations, therefore, the auxiliary winding is omitted.

We will describe techniques for using the transformer voltage waveform to generate feedback information for regulating an SMPS. These facilitate operation across a wide range of input and output conditions and, in embodiments, provide lower cost, inaudible operation and improved output regulation.

SUMMARY

According to a first aspect of the invention there is therefore provided a system for sensing an output voltage of a switch mode power supply (SMPS), the SMPS including a switched magnetic energy storage device for conveying power from an input to an output of said SMPS, said magnetic device having at least one winding, the system comprising; an input to receive a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; a signal follower coupled to said input to generate a decay signal approximating said decaying portion of said sensing signal waveform; a comparator to compare said decay signal with said sensing signal waveform to identify when said sensing signal waveform decays faster than said decay signal; and a sampler to sample said sensing signal responsive to said comparator to provide an output signal sensing said output voltage of said SMPS.

The above described sensing system may be employed in an SMPS controller operating in either DCM/CRM mode or in CCM mode. In DCM/CRM mode the second portion of the feedback signal waveform comprises an oscillatory portion of the waveform (although not necessarily with a complete cycle of oscillation); in CCM mode the second portion of the waveform comprises a portion of the waveform during which input power is switched to the magnetic energy storage device.

In DCM/CRM embodiments the system may be employed to detect a point of substantially zero magnetic flux by detecting a knee in this sensing waveform between the decaying and oscillatory portions of the waveform. At this point the output voltage of the SMPS may be sampled accurately on the primary side since, because the secondary side current is substantially zero, there is substantially no voltage drop across the secondary side components, typically a diode and some series resistance.

In CCM embodiments the system can be used to determine when a power switching device switching input power to the magnetic energy storage device turns on. Typically such a power switching device comprises a bipolar or MOSFET switch which often has a small switching delay. By monitoring the sensing signal waveform the actual switching time of such a device can be established. Furthermore, it is desirable for a CCM mode SMPS controller to be able to control an SMPS in a DCM mode so that this mode can be employed at low load levels. Embodiments of the above described sensing system can be used in both DCM and CCM modes and thus a single, common sensing system can be used for an SMPS controller rather than having to switch between different sensing systems depending upon the operating mode of the SMPS.

Embodiments of the sensing system provide such dual mode operation (triple mode, if CRM is considered as a separate mode).

Depending upon the SMPS implementation, for example where in DCM mode the oscillatory portion of the signal includes more than one cycle of oscillation, there may be more than one point when the sensing signal waveform decays faster than the decay signal. Therefore, the system also includes an enable input to receive an enable signal for disabling the operation of the sampler during the oscillatory portion of the sensing signal. The enable signal may disable the signal follower and/or comparator and/or may gate the comparator output; it may be derived from the sensing signal waveform or, for example, from a drive signal driving a power switching device of the SMPS.

In some embodiments the signal follower includes a decaying peak detector, to detect peaks of the sensing signal and to hold these with a decaying characteristic. In one embodiment the decaying peak detector includes a rectifier coupled to capacitor, with a discharge circuit, such as a current generator, coupled across the capacitor. The comparator may have an offset built in to offset a voltage drop across the rectifier.

The sampler to sample the sensing signal responsive to the comparator may include a sample-hold circuit to sample and hold the sensing signal when the sensing signal waveform decays faster than the decay signal. The sensing signal may be sensed either directly or indirectly, for example by sensing the decay (the output of the decaying peak detector) which, until the sampling point, tracks the sensing signal. In other embodiments the sampler includes an integrator to sample the sensing signal by integrating the sensing signal waveform from the point when the sensing signal waveform decays faster than the decay signal, to a later point on the sensing signal waveform, for example a zero-crossing of the sensing signal waveform. This integration gives a value which is dependent upon the amplitude of the signal at the knee point on the sensing signal waveform, and hence can be used to provide a control signal for controlling the SMPS. Further details of such an "area correlation" method are described in the assignee's co-pending patent application Ser. No. 11/445,476 filed on the same day as this application, inventors Vinod A Lalithambika, Mahesh Devarahandi Indika de Silva, Jay Kumar, Gehan Amaratunga, [SLWK ref: 1365.115US1], titled "Switch Mode Power Supply Controllers," hereby incorporated by reference in its entirety.

The invention further provides an SMPS controller including a sensing system as described above and, in preferred embodiments, a comparator to compare the output signal with a reference and to provide a control output for controlling a switch mode power supply in response to the comparison. The comparator, in embodiments, may comprise an error amplifier to provide an analogue error signal (albeit in embodiments this may be represented in a digital form, though with multiple rather than just two binary levels). Use of an analogue control signal facilitates stabilising the control loop of the SMPS.

In another aspect the invention provides an SMPS controller for controlling the output of an SMPS, the SMPS including a switched magnetic energy storage device for conveying power from an input to an output of said SMPS, said magnetic device having at least one winding, the controller comprising: a sense input to receive a sense signal waveform from said magnetic device; a decaying peak detector coupled to said sense input to detect when said sense signal waveform has a falling slope of greater than a threshold value and to generate a first timing signal: an output to provide an SMPS control signal responsive to a value of said sense signal waveform at a time indicated by said first timing signal.

In embodiments the SMPS control signal is used to regulate an output voltage of the SMPS, for example by controlling a pulse width and/or frequency of an oscillator driving a power switch switching power to the magnetic energy storage device. In some preferred embodiments the controller includes a timing signal input so that the SMPS control signal output does not detect large negative slopes at peaks in a resonant, oscillatory portion of the sense signal waveform. Preferably the controller includes a sample-hold module to sample and hold the sense signal waveform in response to the first timing signal. In implementations of the controller in an SMPS there may be multiple subsidiary peaks in the generally linearly decaying portion of the sense signal waveform and, therefore, the sample-hold module may, in embodiments, sample peaks of this superimposed "noise", holding the last sample before the second timing signal indicates that substantially no power is being supplied by the SMPS, that is the last sample before the sampling is disabled by the second timing signal. In other embodiments an integration-based or "area correlation" sampling technique may be employed.

In a related method the invention provides a method of sensing an output voltage of a switch mode power supply (SMPS), the SMPS including a switched magnetic energy storage device for conveying power from an input to an output of said SMPS, said magnetic device having at least one winding, the method comprising: inputting a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; identifying a knee point said sensing signal waveform between said decaying portion and said second portion of said waveform; and using a value of said sensing signal at said knee point to sense said SMPS output voltage; and wherein said identifying of said knee point comprises fitting an approximate tangent to said decaying portion of said sensing signal waveform; and identifying departure of said sensing signal waveform from said approximate tangent to identify said knee point.

In embodiments the knee point on the sensing signal waveform corresponds to a point at which the secondary current has just dropped to substantially zero (at which point the voltage across a secondary winding may substantially equal an output voltage of the SMPS). It will be appreciated that the sensing signal will in general provide a signal which is proportional to the SMPS output voltage, for example as determined by a primary: secondary or auxiliary: secondary turns ratio of a transformer of the SMPS, rather than voltage which is exactly equal to the SMPS output voltage.

Some embodiments of the method may directly determine when the sensing signal waveform departs from the approximate tangent, by more than a threshold different in slope, to identify the knee point. However in some preferred embodiments when the method is operating (enabled) each departure of the sensing signal waveform, by greater than a threshold level, from the approximate tangent is detected and used trigger a sample (and hold) of the sensing signal (or a signal derived therefrom) until the second portion of the sensing signal waveform is reached, at which point the last detected departure, which was sampled (and held) provides a value of the sensing signal (or a signal derived therefrom) at the knee point. Alternatively an area integration method as indicated above may be employed, using the value of the sensing signal at the knee point by integrating the sensing signal waveform from the knee point to a later point to (indirectly) sense the SMPS output voltage.

In a further aspect the invention provides a method of sensing an output voltage of a switch mode power supply (SMPS), the SMPS including a switched magnetic energy storage device for conveying power from an input to an output of said SMPS, said magnetic device having at least one winding, the method comprising: inputting a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; identifying a knee point on said sensing signal waveform between said decaying portion and said second portion of said waveform; and using a value of said sensing signal at said knee point to sense said SMPS output voltage; and wherein said identifying of said knee point comprises detecting a point of greater than a threshold negative slope in said sensing signal waveform.

There is also provided a method of regulating the output voltage of an SMPS using an output voltage sensing method as described above. The regulating may, in embodiments, comprise comparing the sensed output voltage with a reference level to provide an error signal substantially proportional to the difference between the two, and using the error signal to control the SMPS.

In a still further aspect the invention provides a system for sensing an output voltage of an SMPS, the SMPS including a switched magnetic energy storage device for conveying power from an input to an output of said SMPS, said magnetic device having at least one winding, the system comprising: means for inputting a sensing signal from said at least one winding of said magnetic device, said sensing signal having a waveform with a first, decaying portion during which power is supplied by said magnetic device to said SMPS output and a second portion during which substantially no power; means for identifying a knee point on said sensing signal waveform between said decaying portion and said second portion of said waveform; and means for using a value of said sensing signal at said knee point to sense said SMPS output voltage; and wherein said means for said identifying of said knee point comprises: means for fitting an approximate tangent to said decaying portion of said sensing signal waveform; and means for identifying departure of said sensing signal waveform from said approximate tangent to identify said knee point.

The invention still further provides a system for sensing an output voltage of an SMPS, the SMPS including a switched magnetic energy storage device for conveying power from an input to an output of said SMPS, said magnetic device having at least one winding, the system comprising: means for inputting a sensing signal from said at least one winding of said magnetic device, said sensing signal having a waveform with a first, decaying portion during which power is supplied by said magnetic device to said SMPS output and a second portion during which substantially no power is transferred; means for identifying a knee point on said sensing signal waveform between said decaying portion and said second portion of said waveform; and means for using a value of said sensing signal at said knee point to sense said SMPS output voltage; and wherein said means for said identifying of said knee point comprises: means for detecting a point of greater than a threshold negative slope in said sensing signal waveform.

The skilled person will appreciate that the above-described techniques may be employed in a wide variety of SMPS architectures including, but not limited to, a flyback converter and a direct-coupled boost converter. In some implementations the magnetic energy storage device comprises a transformer with primary, secondary, and auxiliary windings but in other implementations an auxiliary winding may be provided on another inductor of the SMPS. In still other implementations an auxiliary winding may be omitted and the sensing signal derived from a primary winding, for example as described above with reference to FIG. 1.

In a further related aspect the invention provides a switch mode power supply including an SMPS controller as described above.

In some embodiments a system or SMPS controller as described above is implemented mainly or entirely using analogue circuitry. This is because clocked digital systems can introduce higher costs, audible noise problems and output inaccuracies due to the time-quantisation effects of the digital sampling process.

In other embodiments, however, the system or SMPS controller may be implemented partially or wholly using digital circuitry. Thus the invention further provides a carrier medium carrying processor control code such as RTL or SystemC defining hardware to implements such circuitry.

BRIEF DESCRIPTION OF THE DRAWINGS

These and other aspects of the invention will now be further described, by way of example only, with reference to the accompanying figures in which.

DETAILED DESCRIPTION

Figure 1:
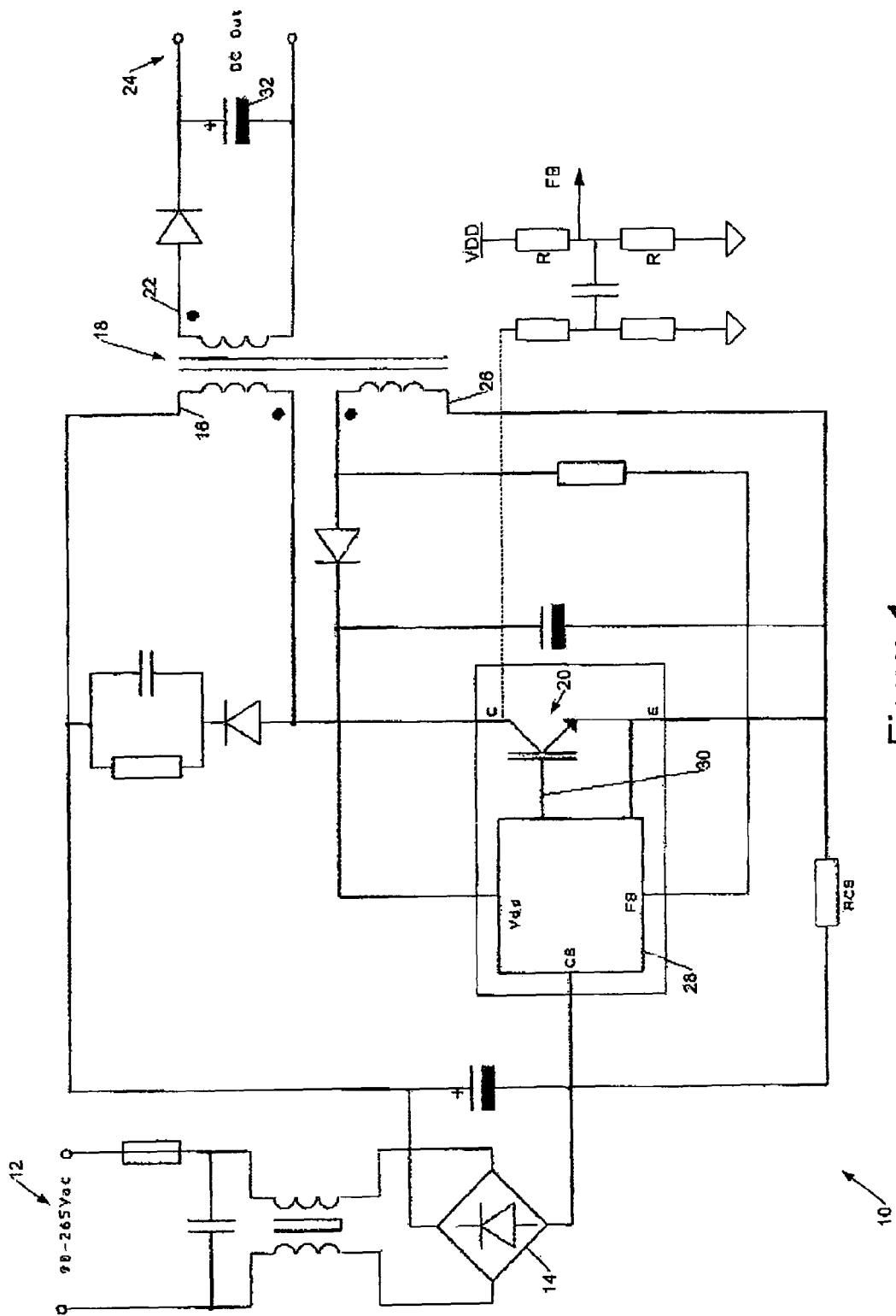
FIG. 1 shows an example of an SMPS incorporating primary side sensing.

Broadly speaking we will describe an apparatus and a related method for measuring an output voltage from a primary side of a power converter. A winding on the power transformer, such as a primary or auxiliary winding, provides a waveform to a peak detector with defined decay characteristic. The peak detector voltage thus forms a tangent to a selected portion of the auxiliary winding waveform. A status signal from the peak detector indicates the time(s) when the tangent coincides with (and departs from) the auxiliary winding waveform, thus in DCM/CRM providing an estimated instant when the transformer secondary winding current has dropped to zero. The status signal controls a sample/hold circuit, which at that instant captures a voltage reflecting a secondary voltage of the transformer, such as a voltage from the primary or an auxiliary winding of the transformer. In CCM essentially the same technique may be employed to determine when the (primary side) power switching device has turned on.

In embodiments an error amplifier compares the captured voltage against a reference to determine an error signal, preferably an analogue error signal, which may be used to regulate the power converter output voltage. The use of an analogue error signal allows the loop gain to be predicted accurately, facilitating loop compensation. Further analogue embodiments of the technique facilitate implementation of a controller with a low power consumption.

One difficulty in primary-side sensing, in particular when operating in DCM/CRM modes, is deciding exactly when to sample the reflected secondary voltage. Ideally this voltage should be sampled at the point at which the current in the secondary winding just falls to zero, as it is at this point that the sampled voltage most accurately represents the output voltage. This is because when the secondary current has just dropped to zero, there is no voltage drop across the secondary rectifier diode or its and the transformer's series resistance, and thus the voltage across the secondary winding is equal to the output voltage. The voltage across, say, the auxiliary winding is equal to the voltage across the secondary winding multiplied by the (known) turns ratio between the two windings, and the secondary voltage can thus be inferred by measuring the voltage across (say) the auxiliary winding at this point.

In CCM mode the secondary voltage can be sensed via a primary or auxiliary winding in a similar way to DCM mode except that the secondary voltage is sampled at a non-zero secondary side current. This non-zero (although sometimes small) current introduces a non-zero voltage drop across the secondary side components, which may comprise for example a diode and some output resistance. Thus preferably in CCM mode some compensation is made for the voltage drop from the secondary side winding to the SMPS output across these components. This compensation can be made, for example, based upon an approximate knowledge of the secondary side current, which can be inferred from the current in the primary side switch.

Figure 2:
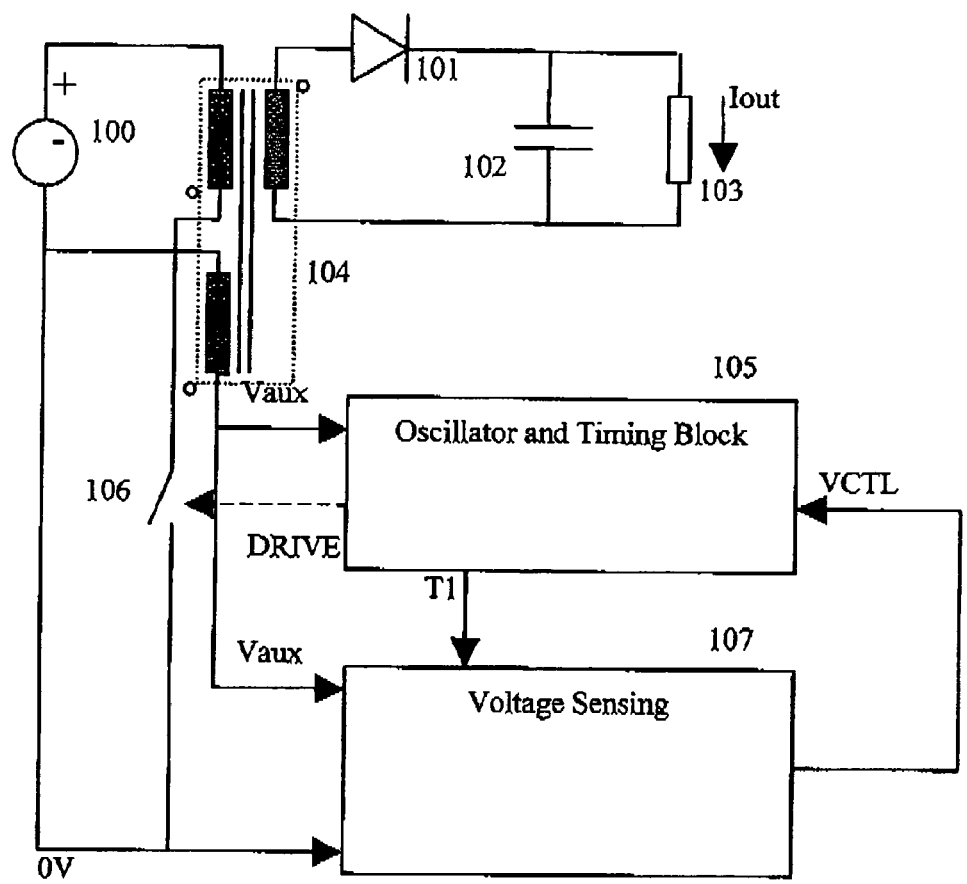
FIG. 2 shows a switch mode power supply (SMPS) including an SMPS controller according to an embodiment of the invention.

Referring now to FIG. 2, this shows a block diagram of a flyback single-switch SMPS 200 incorporating an embodiment of an SMPS controller according to the invention. As illustrated the controller is operating in the context of a flyback SMPS converter, but the skilled person will understand that the techniques we describe are also applicable to other forms of SMPS converters.

A DC source 100 is connected to the primary winding of a transformer in series with a primary side switch 106. The secondary winding of the transformer is connected to an output diode 101 in series with a capacitor 102. A load, represented by a resistor 103 is connected across the output capacitor 102. One end of an auxiliary winding on the transformer 104 is connected between the negative terminal of the DC supply 100 and the other end "VAUX" is connected to an Oscillator and Timing Block 105 and to a Voltage Sense Block 107.

The Voltage Sense Block 107 generates a signal (or value) VCTL representing the required level of output power, from signals VAUX and T1. The VCTL signal is fed back to the Oscillator and Timing Block which generates a DRIVE pulse for switch 106 at an appropriate frequency and duration.

In embodiments the timing signal T1 is derived from the VAUX signal, providing the timing control for the Voltage Sense Block 107. Typically T1 is driven active shortly after VAUX goes positive (allowing time for the initial overshoot waveform artefacts to decay), for example based on a comparison of VAUX with zero or on the DRIVE signal. T1 may be driven inactive when VAUX goes negative again. For example, a comparator may be employed to identify a negative-going zero-crossing of VAUX to drive T1 inactive. Timing signal T1 may be generated either by oscillator block 105 or within voltage sensing block 107.

As previously mentioned, the Oscillator and Timing Block 105 uses the input VCTL to control the frequency and pulse duration applied to the DRIVE output, which controls the main primary switch 106. As the skilled person will understand, the Oscillator and Timing Block 105 may be implemented in many different ways; examples of some particularly advantageous techniques are described in the Applicant's patent applications U.S. 60/698,808 (0513772.4) and PCT/GB2005/050244, hereby incorporated by reference.

Figure 7:
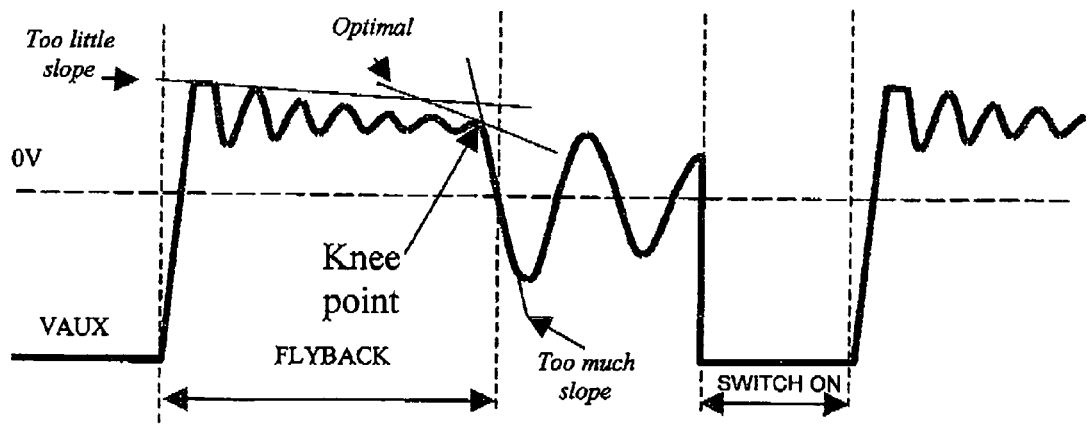
FIG. 7 shows waveforms illustrating the principle of operation of an SMPS controller according to an embodiment of the invention.

Before describing details of the voltage sensing module 107 we first refer to FIG. 7 to describe the tangent-based method of output voltage sensing. The aim of the tangent method of output voltage sensing is to accurately detect the voltage in the transformer auxiliary winding at the knee point, that is the point at which the transformer secondary current drops to substantially zero, as shown in FIG. 7.

The VAUX (sensing) signal from the primary or auxiliary winding of the power transformer typically appears as shown. This is a transform of the secondary winding, generally with superimposed artefacts generated by winding leakage inductance, stray capacitance, and the like. Broadly, the tangent method works by fitting a tangent with a negative slope to the flyback portion of the VAUX waveform. The tangent slope is chosen to optimize the accuracy of identifying the knee point and to ensure that the waveform artefacts have minimal influence. The VAUX signal is then sampled at the knee point and compared to a voltage reference to determine the output error voltage. A preferred practical implementation, as described below.

Figure 3:
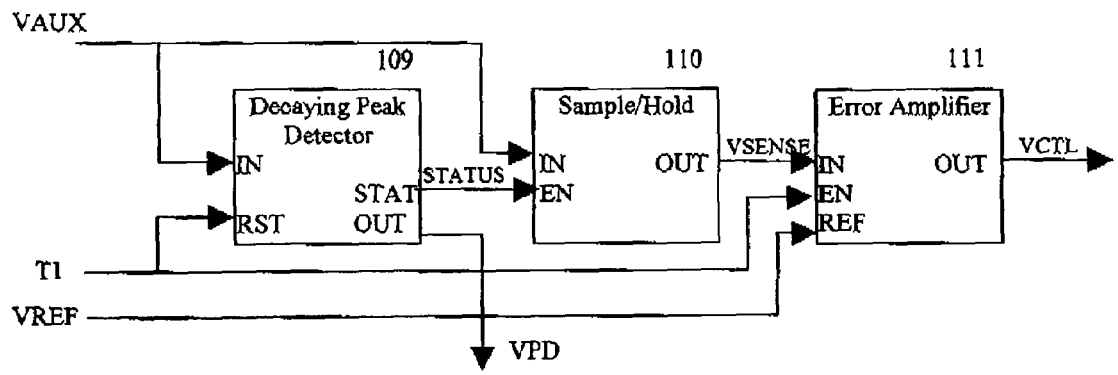
FIG. 3 shows details of the voltage sensing block of the controller of FIG. 2.
Figure 8:
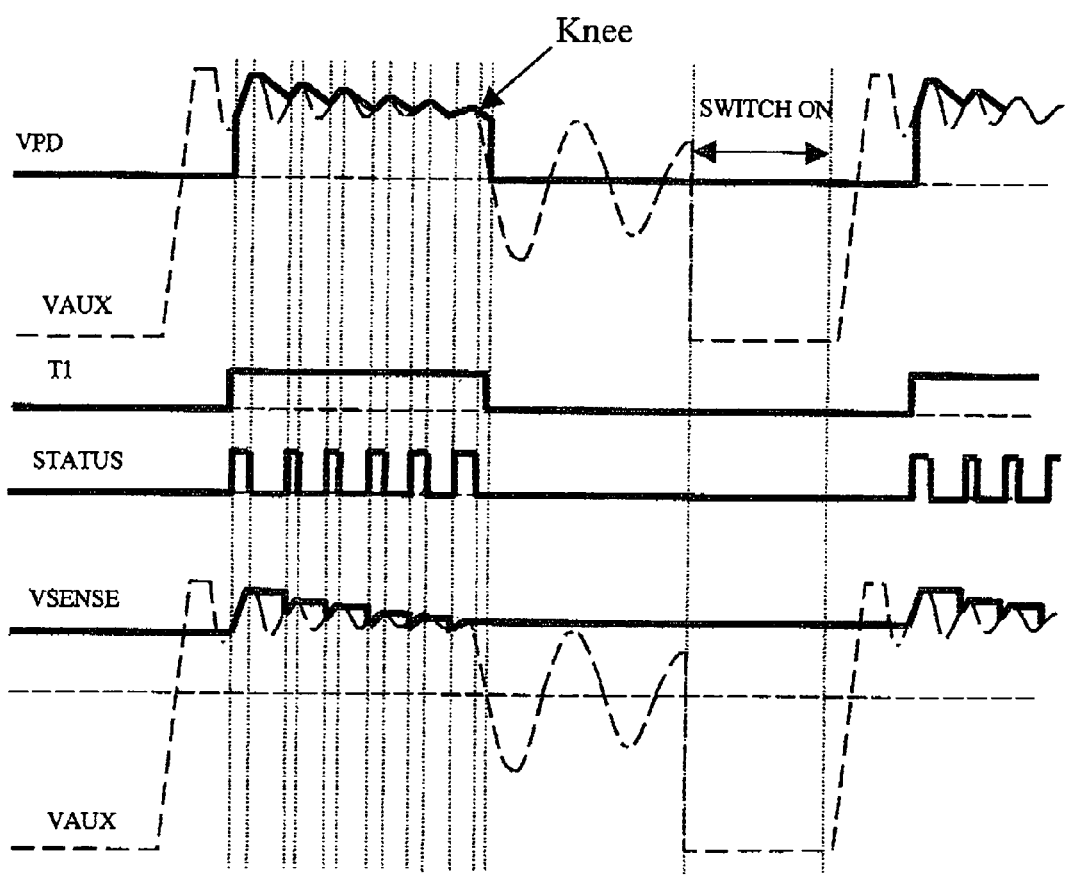
FIG. 8 shows example waveforms illustrating the operation of the SMPS controller of FIG. 3.

Referring now to FIG. 3, this shows the main functional blocks of the Voltage Sensing circuit 107, which together comprise a decaying peak detector block 109, a sample/hold block 110 and an error amplifier block 111, generating the output signal VCTL (output voltage control). Typical waveforms are shown in FIG. 8. The output VPD (voltage peak detect) from the decaying peak detector block 109 is not used in some embodiments; in others it may be used to sense or sample a value of VAUX since it approximately tracks VAUX during its approximately linearly decaying portion and is substantially equal to VAUX at the knee point.

Figure 4:
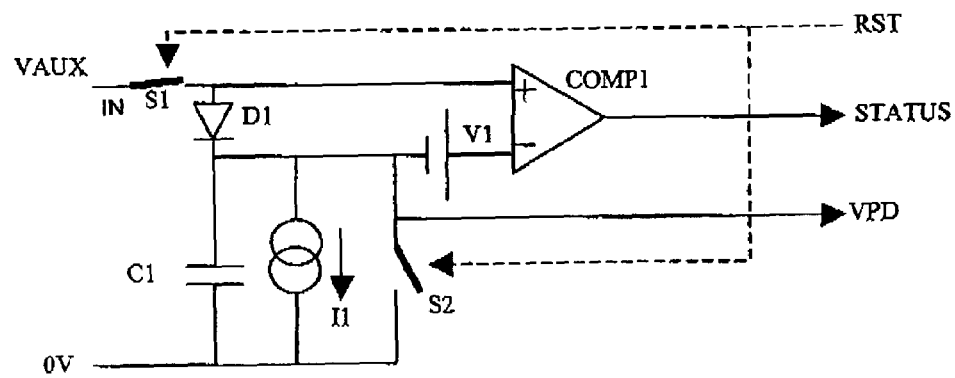
FIG. 4 shows an example decaying peak detector for the voltage sensing block of FIG. 3.

FIG. 4 shows an implementation of the decaying peak detector (DPD) block 109 of FIG. 3.

Referring to FIG. 4, the VAUX is fed into the input (IN) of the DPD block as shown. When timing signal T1 is inactive (low in FIG. 8) the DPD is reset, forcing the output voltage VPD to 0 volts. As shown, T1 is active, and therefore switch S1 is closed and switch S2 is open so that the DPD is not reset. When T1 is active, the circuit works as a peak detector, providing output VPD which decays at a predetermined rate.

Alternatively, the peak detector may be free-running, in which case the EN signal may be gated by T1. As shown in FIG. 8, VPD follows the VAUX waveform except when the slope of VAUX exceeds a certain (negative) value, at which point the VAUX and VPD waveforms separate from one another. The STATUS signal from the DPD is active when the DPD is updating (increasing) the VPD signal.

An example implementation for the decaying peak detector 109, shown as a behavioral model, is illustrated in FIG. 4. A diode D1 and a capacitor C1 together comprise a peak detector; this is enabled when switch S1 is closed and S2 is open. A current sink I1 discharges the voltage on C1, thus defining the slope of the tangent. A comparator COMP1 compares the tangent approximating voltage on C1 with the VAUX input. Preferably a voltage source V1 adds a small DC offset compensating for the forward voltage drop of D1. Thus comparator COMP1 will issue a STATUS active if VAUX is greater than or equal to the (decaying) voltage on C1. Thus the DPD effectively detects when VAUX has greater than a threshold downwards or negative slope. The peak detector is re-initialized by the RST signal, closing switch S2 and opening switch S1, thereby discharging the voltage on capacitor C1. The rate of discharge of C1 is set by I1, which is chosen according to the implementation so that, in embodiments, the voltage on C1 follows the approximately linear descent of VAUX, that is so that it follows an approximate tangent to VAUX prior to its oscillatory or resonant portion.

Figure 5:
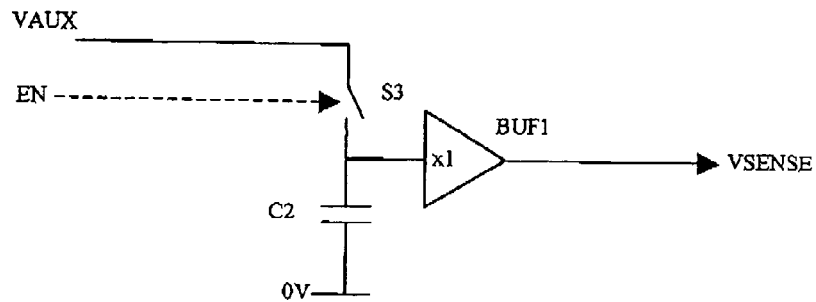
FIG. 5 shows an example sample/hold module for the voltage sensing block of FIG. 3.

An example implementation for the sample/hold module 110 is illustrated in FIG. 5. Buffer BUF1, capacitor C2 and switch S3 together comprise a sample/hold circuit, which samples the VAUX input when EN is active and holds the sampled value when EN is inactive. Thus, the voltage output VSENSE holds the instantaneous value of VAUX when STATUS is driven inactive (at various points in the flyback phase and finally at the knee point), as shown in FIG. 8.

Figure 6:
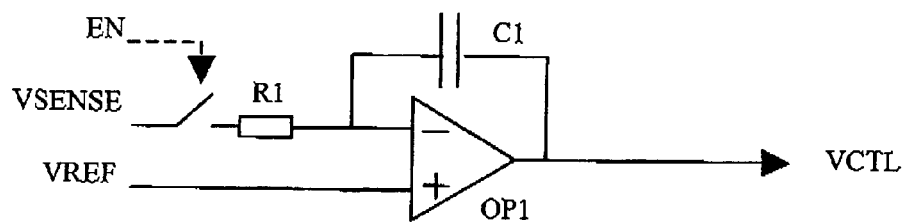
FIG. 6 shows an example error amplifier for the voltage sensing block of FIG. 3.

An example implementation for the error amplifier module 111 is illustrated in FIG. 6. Amplifier OP1, capacitor C1 and resistor R1 form a simple integrator, enabled by switch S4. While input EN is active, switch S4 is closed, enabling the amplifier OP1 to integrate the difference between VSENSE and VREF. The time constant is preferably at least several cycles of oscillator 105, for example around 10 cycles. In this way the accumulated error over many switching cycles may be used by the Oscillator and Timing Block to modify the delivered power and thereby regulate the output voltage. Those skilled in the art will appreciate that the resistor and capacitor shown may be replaced by a variety of different impedance networks, for example in order to compensate the control loop using, say, pole-cancellation techniques.

Referring back once more to FIG. 7, it will be appreciated that it is desirable that the waveform to which the tangent-detection technique we have described is applied is relatively clean, and thus a modicum of filtering may be applied. Additionally or alternatively the waveform may be "qualified" to disable the operation of the tangent detection except in the vicinity of the knee point, for example by disabling the peak detector until a point close to the knee point is reached. This may be implemented, for example, by modeling the flux in the transformer by integrating the voltage on a primary or auxiliary winding of the transformer, more particularly by integrating the sensing signal, from a point of known zero transformer flux to determine a next point of zero transformer flux. This latter point corresponds to the knee on the primary or auxiliary winding sensing signal and hence the timing of this point may be used to define a window within which the tangent method should look at the sensing signal waveform, for example by enabling the peak detector over this time window. Points of known zero-transformer flux correspond to peaks and troughs on the oscillatory portion of the sensing signal waveform and thus, for example, the integrator may be reset at each of these peaks and troughs so that it is always reset at a point of known zero flux before the power switching device is switched on and the switching cycle begins. The peaks and troughs may conveniently be detected using a peak detector, which may take the form of, for example, a differentiator circuit or a diode capacitor circuit. Preferably the circuit which defines a time window, for example, the aforementioned integrator together with a comparator to determine when the integrator once again reaches its reset value, is arranged so that the window is "opened" just before when the knee point is expected. This can be arranged, for example, by comparing the output of the integrator to its reset value, say zero, modified by a small offset.

Broadly, we have described a method and system for identifying the knee point by fitting a tangent to a portion of the power transformer voltage waveform, and sampling the VAUX at the knee point to determine the SMPS output voltage. In preferred embodiments this technique is implemented using a decaying peak detector, providing a timing signal indicating detection of the knee point. Sample/hold and error amplifier circuits may be employed to achieve output voltage regulation.

The techniques we have described provide a low cost method of accurately estimating the output voltage of a switched-mode power supply which achieves better output regulation, reduced audio noise and lower implementation cost than other primary-side sensing techniques.

No doubt many other effective alternatives will occur to the skilled person. It will be understood that the invention is not limited to the described embodiments and encompasses modifications apparent to those skilled in the art lying within the spirit and scope of the claims appended hereto.

All documents, patents, and other references listed above are hereby incorporated by reference for any purpose.

We claim:

1. A method of sensing an output voltage of a switch mode power supply (SMPS), the SMPS including a switched magnetic energy storage device for conveying power from an input to an output of said SMPS, said magnetic device having at least one winding, the method comprising:
inputting a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output;
identifying a knee point on said sensing signal waveform between said decaying portion and said second portion of said waveform; and
using a value of said sensing signal at said knee point to sense said SMPS output voltage; and
wherein said identifying of said knee point comprises fitting an approximate tangent to said decaying portion of said sensing signal waveform; and
identifying departure of said sensing signal waveform from said approximate tangent to identify said knee point, wherein said departure identifying comprises comparing said tangent approximating signal and said sensing signal waveform to identify a time when said sensing signal waveform departs from said tangent approximating signal to identify said knee point.

2. A method of sensing an output voltage of a switch mode power supply (SMPS), the SMPS including a switched magnetic energy storage device for conveying power from an input to an output of said SMPS, said magnetic device having at least one winding, the method comprising:
inputting a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output;
identifying a knee point on said sensing signal waveform between said decaying portion and said second portion of said waveform;
using a value of said sensing signal at said knee point to sense said SMPS output voltage;
wherein said identifying of said knee point comprises fitting an approximate tangent to said decaying portion of said sensing signal waveform;
identifying departure of said sensing signal waveform from said approximate tangent to identify said knee point; and
wherein said tangent fitting comprises detecting one or more peaks of said sensing signal waveform, storing a peak level response to said detecting, and decaying said stored peak level to generate a tangent approximating signal.

3. A method as claimed in claim 2 wherein said departure identifying comprises comparing said tangent approximating signal and said sensing signal waveform to identify a time when said sensing signal waveform departs from said tangent approximating signal to identify said knee point.

4. A method as claimed in claim 3 further comprising sampling said sensing signal at said time when said sensing signal waveform departs from said tangent approximating signal to provide said value of said sensing signal at said knee point.

5. A method as claimed in claim 4 wherein said sampling comprises integrating said sensing signal waveform from said knee point.

6. A method as claimed in claim 4 wherein said departure identifying identifies a plurality of said times of departure of said sensing signal waveform from said tangent approximating signal, the method further comprising identifying a time when substantially no power is supplied by said magnetic device to said SMPS output and using a most recent said sample of said sensing signal prior to said identified time to provide said value of said sensing signal at said knee point.

7. A method as claimed in claim 6 wherein said identifying of a time when substantially no power is supplied by said magnetic device to said SMPS output comprises identifying a crossing through a reference level of said second portion of said sensing signal waveform.

8. A method as claimed in claim 6 wherein said identifying of a time when substantially no power is supplied by said magnetic device to said SMPS output comprises identifying a crossing, through a reference level, of a time integral of said sensing signal waveform, said time integral being from a point of known substantially zero energy storage in said magnetic device.

9. A method as claimed in claim 6 wherein said identifying of time when substantially no power is supplied by said magnetic device to said SMPS output comprises identifying a time with a fixed time delay from a crossing through a reference level of said sensing signal waveform.

10. A method as claimed in claim 1 wherein said magnetic device comprises a transformer, and wherein said inputting of said sensing signal waveform comprises inputting said sensing signal from a primary winding of said transformer.

11. A system for sensing an output voltage of an SMPS, the SMPS including a switched magnetic energy storage device for conveying power from an input to an output of said SMPS, said magnetic device having at least one winding, the system comprising:
means for inputting a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output;
means for identifying a knee point on said sensing signal waveform between said decaying portion and said second portion of said waveform; and
means for using a value of said sensing signal at said knee point to sense said SMPS output voltage; and
wherein said means for said identifying of said knee point comprises:
means for fitting an approximate tangent to said decaying portion of said sensing signal waveform; and
means for identifying departure of said sensing signal waveform from said approximate tangent to identify said knee point, wherein said means for identifying includes means for comparing said tangent approximating signal and said sensing signal waveform to identify a time when said sensing signal waveform departs from said tangent approximating signal to identify said knee point.

12. The method of claim 1, comprising sampling said sensing signal at said time when said sensing signal waveform departs from said tangent approximating signal to provide said value of said sensing signal at said knee point.

13. The method of claim 12, wherein said sampling comprises integrating said sensing signal waveform from said knee point.

14. The method of claim 12, wherein said departure identifying identifies a plurality of said times of departure of said sensing signal waveform from said tangent approximating signal, the method further comprising identifying a time when substantially no power is supplied by said magnetic device to said SMPS output and using a most recent said sample of said sensing signal prior to said identified time to provide said value of said sensing signal at said knee point.

15. The method of claim 14, wherein said identifying of a time when substantially no power is supplied by said magnetic device to said SMPS output comprises identifying a crossing through a reference level of said second portion of said sensing signal waveform.

16. The method of claim 14, wherein said identifying of a time when substantially no power is supplied by said magnetic device to said SMPS output comprises identifying a crossing, through a reference level, of a time integral of said sensing signal waveform, said time integral being from a point of known substantially zero energy storage in said magnetic device.

17. The method of claim 14, wherein said identifying of time when substantially no power is supplied by said magnetic device to said SMPS output comprises identifying a time with a fixed time delay from a crossing through a reference level of said sensing signal waveform.

* * * * *